3,598,668
STAPLE-CONTAINING SOLID PROPELLANT GRAIN AND METHOD OF PREPARATION

David C. Sayles, Huntsville, Ala., assignor to the United States of America as represented by the Secretary of the Army
No Drawing. Filed Nov. 30, 1965, Ser. No. 511,027
Int. Cl. C06d 5/06
U.S. Cl. 149—19            6 Claims

ABSTRACT OF THE DISCLOSURE

Solid propellant grains containing aligned metal staples and a method of preparing the same. In the method of this invention, a solid propellant grain containing metal staples oriented perpendicular to the burning surface is prepared by intimately mixing metal staples with the remaining propellant ingredients to form a castable, doughlike mixture, casting the mixture into a mold, applying a magnetic field to orient the fragments perpendicular to the burning surface and curing the oriented mixture. By using composite stapes containing both a propellant fuel metal and a ferromagnetic metal, the staples of this invention can be aligned without undue sacrifice of favorable fuel properties.

---

The invention described herein may be used by or for the Government for governmental purposes without payment of any royalty thereon.

This invention relates to solid propellants and more particularly to solid propellant grains containing aligned metal staples and to a method of preparing the same.

Metal staples that is, thin fragments of metal wire, fiber, strip or the like, are employed in solid propellant grains to enhance the burning characteristics of the propellant. Incorporation of metal staples throughout the grain accelerates the burning rate by increasing conduction of heat from the burning surface to the interior of the grain. The staples also contribute energy to the propellant mixture, the metal employed normally being aluminum, magnesium or other metal or alloy which releases a large amount of energy upon combustion. Staple-containing propellants are particularly useful for rapid-accelerating rocket motors that require minimum time from launch to target.

One of the problems presented in the use of metal staples in propellant grains is attainment of the desired staple orientation. For maximum effectiveness the staples should be oriented with their longest axis perpendicular to the burning surface. For example, in the case of cylindrical grains having an internal perforation extending axially through the center, the staples should be oriented radically, perpendicular to the surface of the internal perforation. Orientation of staples should also be uniform throughout the grain in order to produce a unifom burning rate. Orientation parallel to the burning surface is undesirable in that a minimum increase in burning rate is realized.

Control of staple orientation in the preparation of propellant grains has proven difficult. In a typical grain preparation process the uncured propellant mixture comprising a liquid polymeric binder, fuel and oxidizer particles, along with the metal staples and various minor additives, is poured under pressure into a mold of the desired configuration, normally an elongated cylinder having an axially disposed mandrel in its center to produce an internal perforation. In this process the staples become aligned in the direction of flow of the viscous propellant mixture, which is at least partially parallel to the mold and mandrel walls. As a result the staples are oriented paralel to the burning surface at the internal perforation and outer edge of the grain. In addition the orientation pattern within the body of the grain is irregular so that the burning rate is not uniform or fully reproducible.

Improved orientation has been obtained by using a ferromagnetic metal as the staple material and aligning the staples magnetically prior to curing the grain. Ferromagnetic metals, however, have unfavorable characteristics as fuel in that they do not produce adequate energy upon combustion comparable to the lighter metals, and the efficiency of the combustion process is lower.

It is therefore an object of this invention to provide a staple-containing propellant grain wherein the staples are oriented perpendicular to the burning surface of the grain.

Another object is to provide a method of orienting metal staples perpendicular to the burning surface in solid propellant grains.

Other objects and advantages will be apparent from the following detailed description.

In the present invention a solid propellant grain containing metal staples oriented perpendicular to the burning surface is prepared by intimately mixing metal staples with the remaining propellant ingredients to form a castable, doughlike mixture, the staples being elongated fragments each comprising a portion of propellant fuel metal and a portion of a ferromagnetic metal, casting the mixture into a mold, applying a magnetic field to orient the fragments perpendicular to the burning surface and curing the oriented mixture. By using composite staples containing both a propellant fuel metal and a ferromagnetic metal, the staples can be aligned without undue sacrifice of favorable fuel properties. The grain prepared in this manner exhibits uniform staple orientation in the desired direction, resulting in substantially improved burning characteristics.

The solid propellant compositions for which the present invention is applicable normally comprise a cured, intimate mixture of a liquid polymeric binder, fuel particles and an oxidizer, along with the staples and various minor additives. The chemical composition of the mixture is not critical, and all that is required is that the mixture exhibit suitable physical properties in the uncured state to allow casting and magnetic alignment of the staples.

The liquid polymeric binder component in the propellant mixture can be any of the previously used materials such as polysulfides, polyurethanes, polybutadienes, polybutadiene-acrylic acid copolymers and the like. Doublebase type compositions employing nitrocellulose as the binder and a liquid plasticizer, such as a nitrate ester, can also be fabricated by the method of this invention. The oxidizer can be any of the conventional oxidizers exemplified by the alkali earth perchlorates and nitrates, ammonium nitrate and ammonium perchlorate, with ammonium perchlorate being preferred. The fuel particles can be any high-energy fuel additives such as aluminum, magnesium zirconium, boron and the like or alloys thereof, in the form of fine metal powder. Conventional minor additives, such as, stabilizers, burning rate catalysts and ballistic modifiers can also be present in the mixture.

The metal staples in the present invention are relatively thin, uniform-sized metal fragments having a composite structure, at least one layer of a ferromagnetic metal and a propellant fuel metal extending the length of the fragments. The ferromagnetic metal may be iron, nickel, cobalt or any other ferromagnetic metal or alloy, with iron and nickel being prefererd. The term "propellant fuel metal" as used herein is intended to encompass the metals which are used in propollant compositions because of their favorable burning characteristics. Aluminum, magnesium, and aluminum-magnesium alloys are the metals normally used, and aluminum is preferred because of its low cost and high effectiveness. Since the ferromagnetic metals detract from the performance of the propellant, the minimum effective amount of this component needed to obtain alignment of the fragments is preferred. In general at least 10 weight percent is required, and 10 to about 50 weight percent may be employed. The exact proportion of ferromagnetic metal required will vary with the web thickness of the propellant grain and the strength of the magnetic field available.

The metal staples may be utilized in the form of wire, narrow strips of metal sheet or the like. The composite staple structure can be formed by coating or deposition of one of the metal components on the other. For example aluminum wire can be coated with iron by conventional methods and cut into the desired lengths. In the case of sheet metal, alternate layers of each component can be bonded together, for example, by means of an epoxy resin, and the composite sheet can then be chopped to form strips of the required dimensions.

The composite staples employed in the present invention may in general have the same dimensions as previously used staples. In the case of wire, fragments .02 to .04 inch in diameter and .20 to .35 inch long are preferred. For metal strips the preferred dimensions are 0.20 to 0.35 inch long, 0.04 to 0.06 wide and 0.02 to 0.04 inch thick. The staples are added to the propellant mixture in an amount such as to comprise about 1 to 10 weight percent of the total composition.

The metal staples are added to the solid propellant mixture at any time prior to curing, that is, they may be added when the other components are being mixed together or after all of the other ingredients have been mixed. The only critical aspect is that the staples be added before curing so that magnetic alignment can be effected. After addition of the staples the mixture should be thoroughly agitated to ensure substantially uniform distribution throughout the grain.

The staple-containing mixture is formed into a propellant grain by pouring the mixture into a mold of the desired configuration, the mold normally serving in addition as the rocket motor casing. Conventional casing techniques may be employed in this step.

The staples are then aligned by application of a magnetic field oriented perpendicular to the propellant burning surface. For an end-burning charge the magnetic field would be applied longitudinally with the body of the grain. For a grain having an internal perforation, orientation would be radially outward from the surface of the perforation. In the latter embodiment the mandrel which is used for forming the perforation may also be employed in applying the magnetic field, the mandrel being of course a magnetized ferromagnetic member. In order to attain the desired alignment, the mandrel should partially project from the mold so that the inserted portion acts as only one pole of the magnet. A horseshoe-type magnet, with one leg thereof being used as a mandrel, is suitable for this purpose. While the magnetic flux is being applied the inherent curing action of the propellant mixture causes it to thicken so that once the particles are oriented they are held rigidly in position.

The grain containing aligned staples is then fully cured by conventional methods, which normally comprise mild heating for an extended period.

This invention is further illustrated by the following example.

EXAMPLE

A solid propellant mixture was prepared by combining the following ingredients, in weight percent: nitrocellulose, 17; nitroglycerin, 29, ammonium perchlorate, 41; triacetin, 7; 2-nitrodiphenylamine, 1: resorcinol, 1; and metal staples, 2. The metal staples were composite layered strips 0.25 inch long, .04 to .05 inch wide and .025 inch thick prepared by bonding aluminum sheet to an equal thickness of iron sheet and chopping the sheet into strips. The mixture was poured into 2 inch diameter rocket motor casings 10 inches long and having a 1 inch diameter mandrel inserted axially therein. The mandrel was a steel member connected to a conventional electromagnet. Upon application of a magnetic field the staples were aligned perpendicular to the mandrel. The resulting grains were then cured by mild heating. In test firings the burning rates obtained for propellant grains prepared in this manner were increased 75 to 150% over the value for similar grains containing unaligned staples. In addition, plots of pressure-time traces in test firings of grains with the aligned staples showed a smooth initial pressure increase at the outset and a rapid tailoff at completion of burning, these characteristics being highly favorable for maximum thrust efficiency.

The above example is merely illustrative and is not to be understood as limiting the scope of the invention, which is limited only as indicated by the appended claims.

What is claimed is:

1. A solid propellant grain comprising a cured intimate mixture of a polymeric binder, fuel particles, an oxidizer therefor and metal staples, said grain conforming to a predetermined shape and having a burning surface, said staples comprising a composite structure consisting of layers of a propellant fuel metal and a ferromagnetic metal, said propellant fuel metal being selected from the group consisting of aluminum, magnesium, zirconium, boron and alloys containing major portions thereof, said ferromagnetic metal being selected from the group consisting of iron, nickel, cobalt and alloys thereof, said ferromagnetic metal being provided in said staple at a proportion of 10 to 50 weight percent, and said staples being aligned perpendicular to said burning surface.

2. The method of preparing a solid propellant grain having metal staples aligned perpendicular to the burning surface thereof which comprises intimately mixing a polymeric binder, fuel particles an oxidizer therefore and metal staples to form a viscous gel-like mixture, said staples comprising elongated metal fragments consisting of layers of a propellant fuel metal and a ferromagnetic metal extending longitudinally throughout said fragments, pouring said mixture into a mold having a surface conforming to said burning surface, applying a magnetic field to said mixture perpendicular to said burning surface whereby said particles are aligned with their longest axis perpendicular to said burning surface and curing said grain, said propellant fuel metal being selected from the group consisting of aluminum, magnesium, zirconium, boron and alloys containing major portions thereof, said ferromagnetic metal being selected from the group consisting of iron, nickel, cobalt and alloys thereof, said ferromagnetic metal being provided in said staple at a proportion of 10 to 50 weight percent, said staples being provided in said mixture at a proportion of 1 to 10 weight percent, said staples being strips 0.20 to 0.35 inch long, 0.04 to 0.06 inch wide and 0.02 to 0.04 inch thick.

3. The method of claim 2 wherein said mold is an elongated cylindrical container having an axially disposed mandrel extending throughout its length.

4. The solid propellant grain of claim 1 wherein said staples are provided in said mixture at a proportion of 1 to 10 weight percent.

5. The solid propellant grain of claim 4 wherein said staples are strips 0.20 to 0.35 inch long, 0.04 to 0.06 inch wide and 0.02 to 0.04 inch thick.

6. The solid propellant grain of claim 5 wherein said solid propellant grain is an elongated cylindrical grain having an axially disposed internal perforation extending throughout its length.

References Cited

UNITED STATES PATENTS

| 3,109,375 | 11/1963 | Rumbel et al. | 102—39X |
|---|---|---|---|
| 3,140,659 | 7/1964 | Van Artsdalen et al. | 102—38 |
| 3,140,663 | 7/1964 | Rumbel et al. | 149—87X |
| 3,192,289 | 6/1965 | Jagiello | 264—3 |

BENJAMIN R. PADGETT, Primary Examiner

U.S. Cl. X.R.

149—15, 20; 120—102; 264—3R